2,036,280

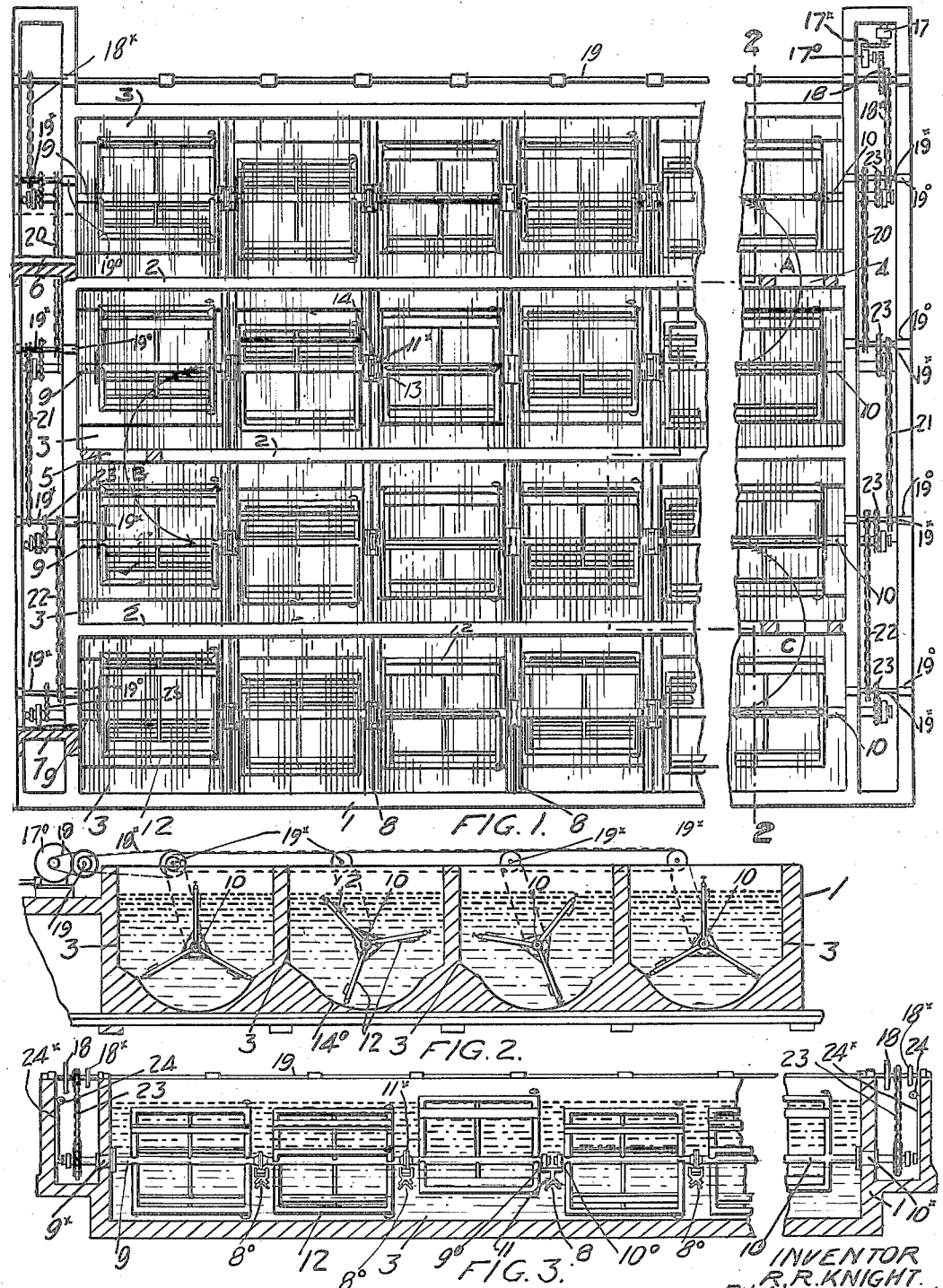

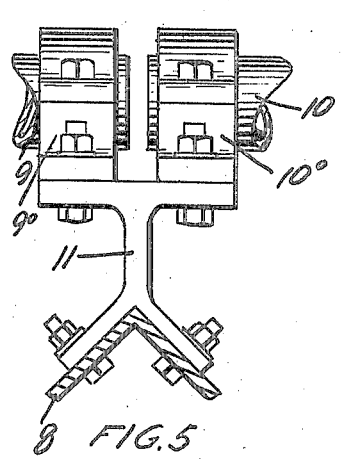
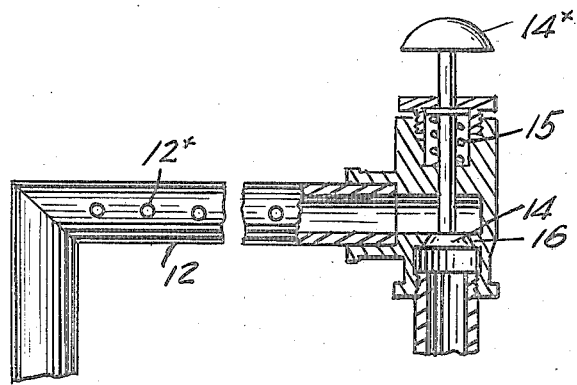
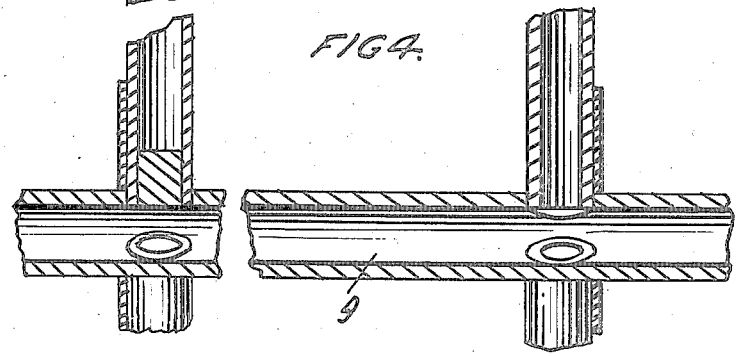
Fig. 5. Fig. 4.
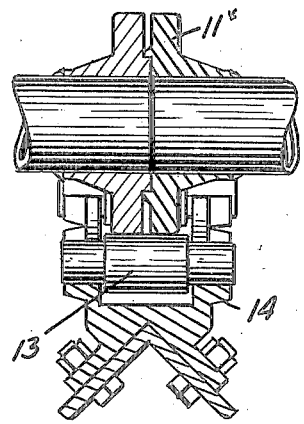
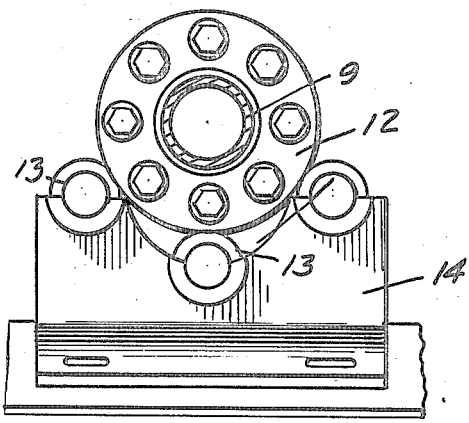
Fig. 6. Fig. 7.
INVENTOR
R.R. KNIGHT
BY Patented Apr. 7, 1936

UNITED STATES PATENT OFFICE 2,036,280

SEWAGE AERATOR

Raymond Rice Knight, Toronto, Ontario, Canada

Application July 14, 1934, Serial No. 735,129

4 Claims. (Cl. 210—8)

My invention relates to improvements in sewage aerators, and the object of the invention is to impart to flowing sewage a more definite circular motion transversely of the main flow to produce a circulating movement of the sewage such as will bring a maximum amount thereof into contact with the atmosphere at the sewage surface level and for a maximum length of time and at the same time prevent the deposit of solids, sludge or sedimented matters at the bottom of the aeration tanks, and it consists essentially of the arrangement and construction of parts as hereinafter more particularly explained.

Fig. 1 is a plan view of my sewage aerator.

Fig. 2 is a sectional view on line 2—2 Fig. 1.

Fig. 3 is a transverse sectional view taken through the sewage channels and showing the rotators in full.

Fig. 4 is an enlarged sectional detail of the parts of one of the rotators and the air valve by which the flow of air therethrough is controlled.

Fig. 5 is a detail of the supporting bearing for the inner ends of the rotator shaft members.

Figs. 6 and 7 are respectively a cross sectional view and a side elevation of the intermediate antifriction supports for the rotator shaft members.

In the drawings like letters of reference indicate corresponding parts in each figure.

1 indicates the aerator tank provided with equally spaced transverse walls 2 forming transverse channels 3 connected together by intercommunicating openings 4 and 5, the opening 4 being arranged at one end of each alternate wall 2 and the opening 5 at the opposite end of the remaining wall thereby forming a continuous zigzag channel extending from the inlet opening 6 to the discharge opening 7 as indicated by arrows A, B and C. Each channel 3 is provided with transverse supporting beams 8 which are inverted V-shape in form so as to discourage the settlement of sediment thereon.

9 and 10 are axially aligned tubular shafts extending through stuffing boxes $9^x$ and $10^x$ (see Fig. 3) mounted in the end walls of each channel 3 and at their inner ends mounted in bearings $9^0$ and $10^0$ carried by a supporting bearing 11 on the central beam 8. On each shaft 9 and 10 is mounted a plurality of rotators, each rotator comprising a plurality of U frames 12 extending radially from the shaft and preferably spaced 120° apart. Each frame is provided with perforations $12^x$ (see Fig. 4) in its transverse portion for the discharge of air and so placed as to direct it tangentially to the circular path of the rotator as the rotator revolves, such discharge being controlled by mechanism hereinafter described to open during the lowermost 120° of the rotator's revolution and to be cut off during the remainder of the revolution.

Between each rotator is mounted on the shaft members 9 and 10 a circular flange $11^x$ (Fig. 6) designed to travel on antifriction rollers 13 mounted in a bracket 14 carried by beams $8^0$ at each side of the centre beam 8 of the machine. The rotators are placed in staggered formation across the aerator, that is each in advance circumferentially of the preceding one. In the drawings each rotator is advanced 30° in circumferential position in relation to the position of the preceding rotator.

One arm of each U frame 12 is tubular and connected to the shaft 9 or 10 to feed air to the perforations and at the angle formed between at the junction of such frame arm and the perforated transverse portion of the frame is provided with a valve 14 (Fig. 4) having a mushroom roller or low friction type head which is spring pressed outward to hold the valve $14^x$ on its seat 16 to cut off the supply of air between the shaft 9 or 10 and the perforations of the transverse portions of the frame. The lower portion of each channel forms a guide $14^0$ which may be covered with steel strips with which the heads have sliding contact to compress the spring 15 of the valve 14 to move such valve from its seat. It will thus be seen that the valve of each rotator is opened and closed successively with the valves of the next adjacent rotator so as to increase the tendency to circular and spiral motion in the sewage flow.

The rotator shafts and rotators are rotated from the motor 17 connected by a sprocket drive $17^x$ to a reduction gear $17^0$, the shaft of which is connected by a sprocket drive 18 to a main drive shaft 19. $19^x$ are a series of short shafts mounted in suitable bearings as indicated at $19^0$ and interconnected by sprocket drives 20, 21 and 22, the shafts $19^x$ adjacent the main shaft 19 being driven therefrom by a sprocket drive $18^x$. Each shaft 19 is connected by a sprocket drive 23 to an adjacent tubular shaft 9 and 10 and thereby driving the rotators from the motor 17. Gears, pinions and worms can also be utilized for rotating the rotators.

24 are air supply pipes supplied with air under hydrostatic pressure from a main source and from which branch pipes $24^x$ lead to the end of each tubular shaft 9 and 10.

The device operates as follows:—

The rotators 12 are revolved at slow speed submerged in the sewage flow in the channels 3 as such sewage passes at a predetermined rate of speed between the inlet 6 and outlet 7. As the rotators revolve the valves 14 of each rotator are successively opened to permit the compressed air fed from the pipes 24 passing to and through the tubular shafts 9 and 10 and a side arm of each frame 12 to the valve 14. As the frames revolve through the lower third of the circular path or 120°, the valves 14 are opened by engagement of the mushroom or other type heads with the trackway 14⁰ thereby permitting the air to flow to the perforations 12× to be discharged tangentially into the sewage flow adjacent to the bottom of the tank to increase the tendency to transverse movement of the sewage as it passes longitudinally through the channels creating a circulating spiral flow subjecting the sewage not only to air within the sewage body but also for a maximum length of time to the atmosphere to have surface contact therewith and at the same time keeping the sludge from settling in the bottom of the tank.

What I claim as my invention is:—

1. A sewage aerator comprising a tank forming a passage for sewage between an inlet and an outlet opening in the walls of the tank, rotators for imparting a circular motion to the fluid during its forward flow, perforated tubular members carried at the periphery of each rotator parallel to the axis thereof for directing air tangentially in a forward direction, means for feeding air thereto, and means for controlling the feed so that such air flow takes place only during each lower portion of each rotator's revolution.

2. A sewage aerator comprising a tank forming a passage for sewage between an inlet and outlet, a plurality of rotators revolubly mounted in the passage and provided with radial tubular frames each having a perforated cross portion at the rotator periphery, the frames of one rotator being set in staggered relation to the frames of the next adjacent rotator, and means for supplying compressed air to the perforated portions of each frame to flow therethrough during the lower portion of each rotator's revolution.

3. A sewage aerator comprising a tank provided with dividing walls to form parallel channels, an inlet adjacent one end of the tank and an outlet adjacent the opposite end of the tank and communicating opening in the dividing walls set at one end of each alternate wall and at the opposite end of the remaining walls, a plurality of suitably driven rotators mounted in axial alignment in each channel and provided with tubular frames for creating circular motion of the sewage during its forward flow, and pneumatic means coacting with the frame for increasing the circulation of the sewage generated by the revolving rotators.

4. A sewage aerator comprising a tank forming a passage for sewage between an inlet and an outlet opening in the walls of the tank, rotators mounted in a vertical plane and provided at their periphery with tubular perforated members extending parallel to the rotator axis and suitable ducts for supplying air to the perforated members, a portion formed at the bottom of the tank curved to extend concentrically with and closely adjacent to the periphery of the rotators, and a valve between each tubular duct and the supply duct provided with a valve stem and head held in the open or unseated position by spring pressure and closed by the engagement of the valve stem with the curved portion at the bottom of the tank.

RAYMOND RICE KNIGHT.